(No Model.)
C. BILLUPS.
PLOW.
No. 402,390. Patented Apr. 30, 1889.
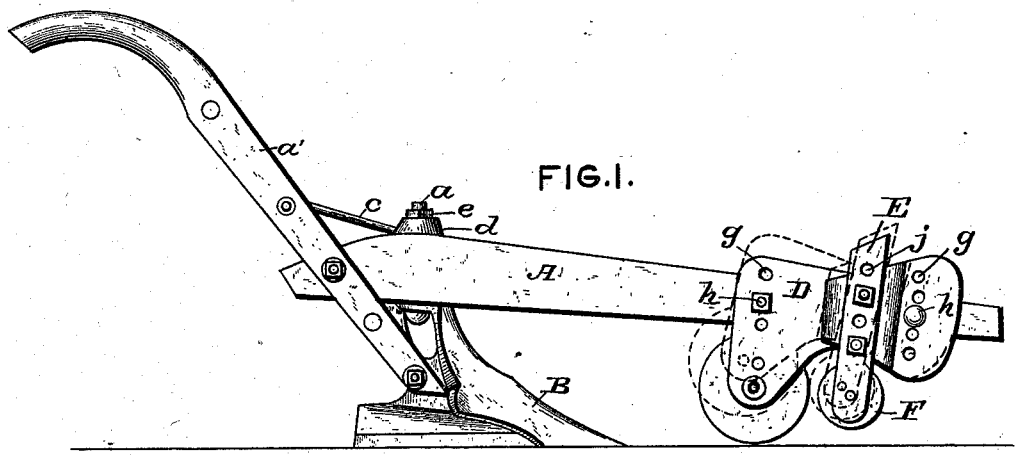
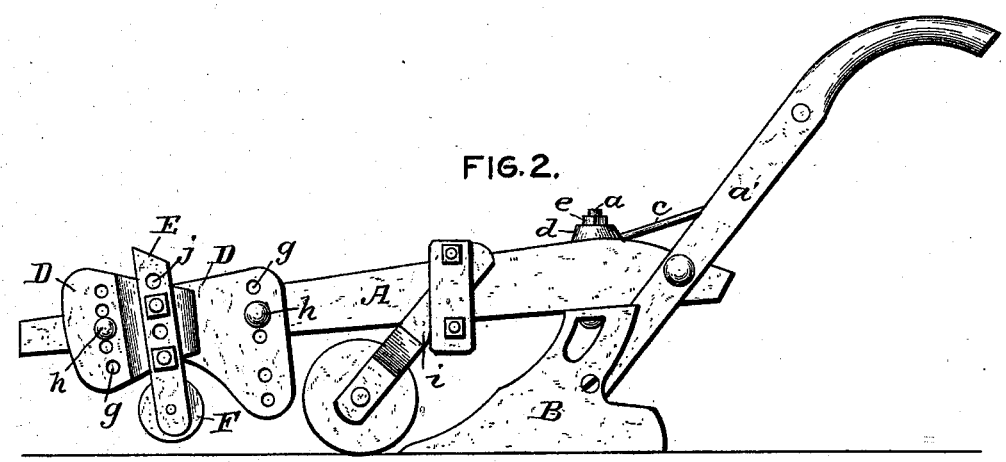
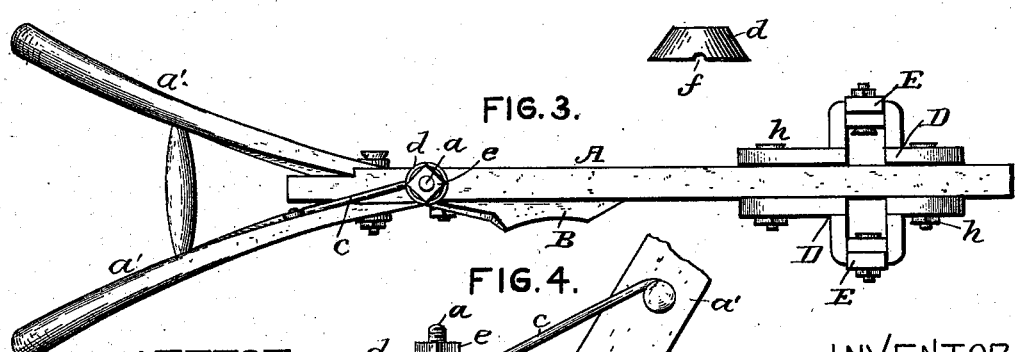
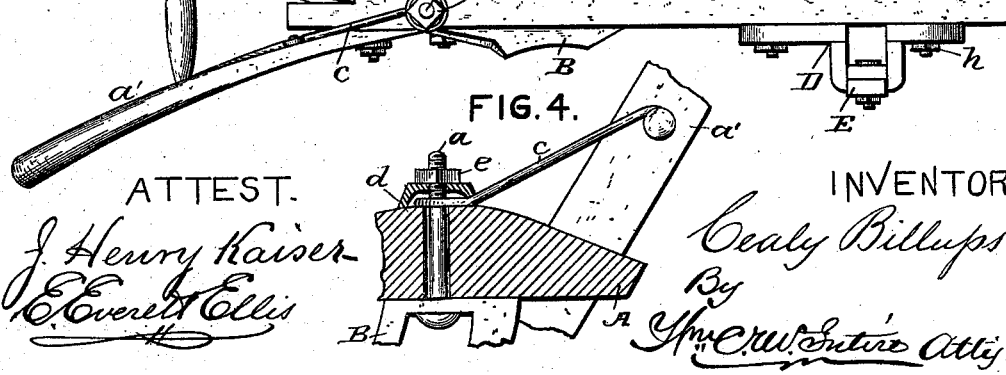
ATTEST.
J. Henry Kaiser
E. Everett Ellis
INVENTOR
Cealy Billups
By

UNITED STATES PATENT OFFICE.

CEALY BILLUPS, OF NORFOLK, VIRGINIA.

PLOW.

SPECIFICATION forming part of Letters Patent No. 402,390, dated April 30, 1889.

Application filed December 29, 1888. Serial No. 294,941. (No model.)

*To all whom it may concern:*

Be it known that I, CEALY BILLUPS, a citizen of the United States, residing at Norfolk, in the county of Norfolk and State of Virginia, have invented certain new and useful Improvements in Plows; and I do hereby declare the following to be a full, clear, and exact description of the invention, such as will enable others skilled in the art to which it appertains to make and use the same.

This invention relates to certain new and useful improvements in plows; and it consists, substantially, in such features of construction, arrangement, and combinations of parts as will hereinafter be more particularly described or pointed out.

The object of the invention is to provide a plow of such peculiar construction and arrangement of parts as will enable the farmer to turn under pea-vines or pea growths much more effectively than heretofore and without the delays hitherto attending this work.

Pea-vines generally run out to considerable lengths, and they rapidly gather in large bunches about the throat of a plow, and for every few yards the plow becomes choked and must be stopped. Large numbers of vines are thus collected and left upon the surface of the soil at every place where the plow is stopped. If a colter of any kind is used to cut the vines, the work of cutting lifts the plow out, and if you weight it down with a chain or other contrivance it is difficult to secure a uniform depth of plowing, and then even much of the vine or pea growth is left to show upon the surface.

By my invention I accomplish that which is desirable, as will be more fully understood hereinafter, when taken in connection with the accompanying drawings, wherein—

Figure 1 is a view taken from one side of a plow constructed in accordance with my invention, and Fig. 2 is a similar view taken from the opposite side. Fig. 3 is a top or plan view, and Fig. 4 is a view in detail to more clearly indicate the construction of certain parts.

In carrying my invention into effect I attach to the front end of the plow-beam a pair of adjustable jaws and a wheel or roller to give the necessary weight to force the colter through the vines, the wheel at the same time governing the depth and mashing or pressing down the vines in such manner as that they will be completely enveloped or covered up by earth. The said wheel or roller is supported by the jaws in an adjustable manner, so as to enable the same to be raised or lowered, and the jaws themselves are capable of adjustment from either end, so as to permit of the putting in or taking out of either the colter or roller, as may be preferred.

Reference being had to the several parts of the drawings by the letters marked thereon, A represents the beam, to which is secured the standard B by means of a bolt, $a$, passing through the same, as shown. Over this bolt $a$ is hung the eye portion of a brace-rod, $c$, that extends to and is secured to one of the handles $a'$ $a'$. Surrounding the upper end of bolt $a$ is a washer, $d$, that is made concave on its under side, so as to fit over the "eye" of the brace-rod $c$, thus doing away with the necessity for nail or bolt, as heretofore, for holding this end of brace-rod $c$. The nut $e$, coming down upon the washer $d$, serves to tighten all the parts and hold them firmly in place. In this way a firm bracing of the weaker handle is had, while the said washer $d$ is at the same time greatly supporting the beam A where the main bolt-hole is bored. The washer $d$ is formed with a notch or recess, $f$, in its bottom edge, which fits over the brace-rod in the manner shown, and it is evident that no turning thereof can take place, and that a neat and strong finish is had.

To the forward end of the beam A, I secure a pair of jaws, D D, which are preferably made of cast-iron, so as to furnish the desired weight. The said jaws are provided at both their rear and forward ends with a series of openings, $g$ $g$, arranged in a slight curve, so as to permit of the same registering with the opening in the beam through which the securing-bolts $h$ $h$ pass. The dotted lines in Fig. 1 indicate the greater or less adjustment of either the wheel or colter, as may be desired, in use.

I preferably employ the colter as shown in Fig. 1, where the same is shown to be adjustably held between the rear ends of the jaws; but, if desired, I may resort to the usual construction and arrangement of colter, such as is shown in Fig. 2, for instance, in which the same is attached to a standard, *i*, that is cuffed or secured to the plow-beam.

Adjustably held by the jaws D D are two legs, E E, which support the roller or wheel F, the said legs being formed or provided with suitable openings, *j*, to permit of their adjustment vertically, and they are secured to the jaws by means of bolts and nuts, as shown. The said legs E E may be made of wood; but, as before stated, it is preferable to make the jaws of cast-iron, and from the construction and arrangement of the several parts it will be seen that the weight required to keep the colter cutting through the vine is secured; also, that the wheel or roller will be caused to press or bear down the vines or weed, and finally the depth is thoroughly governed. In this connection the roller should not be understood as possessing the single value of a guide-wheel, but, rather, it should be attributed the value of holding down the vines, so as to permit the knife to move more easily and cut the vines, the necessary additional weight for effecting this being supplied by the jaws D D.

From the foregoing description it will be seen that the construction and arrangement of the several parts, together with the ready adjustments and reversibility thereof, render the ready and easy accomplishment of the results desired, and it is obvious that many simple variations could be resorted to without departing from the scope of my invention.

Having thus described my invention, what I claim as new, and desire to secure by Letters Patent, is—

1. In a plow, the combination, with the beam, of the brace *c*, secured to one of the handles and having an eye resting on the beam and hung over the top end of the beam-bolt, the concave washer having a notch in its edge to fit the brace, the bolt *a*, and nut, all substantially as shown, and for the purpose described.

2. In a plow, the combination, with the beam, of a pair of adjustable jaws attached thereto at or near its forward end and adapted to carry a rolling colter, and a pair of legs or brackets having a roller vertically adjustable on the jaws, substantially as described.

In testimony whereof I affix my signature in presence of two witnesses.

CEALY BILLUPS.

Witnesses:
LAWRENCE ROYSTER,
K. H. GAYLE.